Patented Feb. 5, 1929.

1,701,129

UNITED STATES PATENT OFFICE.

SAMUEL E. SHEPPARD AND JOHN J. SCHMITT, OF ROCHESTER, NEW YORK, ASSIGNORS TO EASTMAN KODAK COMPANY, OF ROCHESTER, NEW YORK, A CORPORATION OF NEW YORK.

HARD-RUBBER COATING COMPOSITION AND PROCESS OF MAKING THE SAME.

No Drawing.　　　Application filed March 18, 1925.　Serial No. 16,571.

This invention relates to hard rubber coating compositions and to processes of making same. One object of the invention is to provide a coating composition of hard rubber which is readily flowable or sprayable and yet contains a useful percentage of hard rubber in solution. Another object of the invention is to provide a hard rubber solution or varnish which will dry quickly. Still another object of the invention is to provide a solution of hard rubber which will adhere readily to a clean metal surface without the necessity of a special priming coating of other material. A further object of the invention is to provide a hard rubber varnish which can be applied by brushing, dipping or spraying so as to form a hard, waterproof, resistant coating, having the required luster. Another object of the invention is to provide a process for making such compositions or varnishes. Other objects will hereinafter appear.

We have found that solutions of hard rubber, which attain the hereinabove enumerated objects may be prepared by fluxing the hard rubber and then dissolving it in a suitable solvent thereof. By hard rubber we include rubber which has been vulcanized until it contains roughly from 15 to 40% of sulphur. Preferably, but not necessarily, we first subject the hard rubber to a treatment which makes it more susceptible to the action of the flux. Moreover, the flux mixture should preferably contain a drying oil, which greatly improves the qualities of the ultimate solution when used as a varnish. By drying oil we include those unsaturated oils, which are commonly used in coating compositions, because of their ability to become hardened or dried more or less rapidly when exposed to the air.

We shall now describe the preferred embodiment of our invention, but it will be understood that it is not restricted to the details hereinafter given, except as indicated in the appended claims. Any wholly or partially vulcanized rubber may be employed. If crude rubber is to be used, it is first vulcanized until it has a sulphur content of from 15 to 40%, say for instance, 25%. We have found that hard rubber dust, or similar waste material from rubber manufacture, is especially useful. In fact we prefer to have the hard rubber in fine or comminuted form to facilitate our process.

This material can be immediately fluxed; but we prefer to heat it until it becomes more susceptible to the action of the flux. This heating is preferably done in a suitable non-solvent, preferably an aqueous alkaline solution. For example, 60 parts of hard rubber by weight may be digested with 300 parts of a 5% caustic soda solution for 2 to 5 hours at or near the boiling point. This greatly facilitates the rapid and uniform fusing of the rubber with the flux in the subsequent steps of the process. The action of the hot dilute alkali may remove some sulphur and in some instances may lower the percentage of the latter from 3 to 8%. But the main effect is the increased susceptibility of the rubber to the flux. We prefer to wash the rubber free from alkali and dry it before the subsequent steps take place.

For a flux we prefer a mixture containing a drying oil, generally combined with a resin. Thus we may use any of the well-known drying oils of the paint and varnish industry and likewise any of the well-known resins like the copal resins,—Pontianak, kauri, Manila, Zanzibar being examples. Dammar resin is also useful. We have found, however, that a simple and relatively inexpensive yet effective flux is a mixture of rosin and China wood oil. As stated in U. S. Patent, 1,093,967, Barringer, April 21, 1914, page 1, lines 42 to 66, China wood oil functions without the use of drying agents such as are used in linseed oil varnishes. It will be noted in the following example that our preferred composition is free from such drying agents, our oil drying in the absence of such a drying agent from our varnish. Thus the harmful effects of such agents, noted by Barringer are avoided.

Accordingly we may melt 28 parts by weight of rosin and then stir into it 12 parts by weight of China wood oil. Into the 40 parts of flux thus formed we thoroughly stir 60 parts of comminuted hard rubber, preferably after it has been made susceptible to the flux by the heating treatment described above. The composition thus obtained is heated to a temperature between 200° C., and 250° C., until a homogeneous fusion is obtained.

The fused mass of fluxed hard rubber, thus obtained, is then dissolved in a solvent thereof. While any solvent may be employed which will dissolve the above recited ingredients, we have found that the liquid members of the benzene series of hydrocarbons are especially useful. For example, we may dissolve the fluxed hard rubber in commercial benzol or coal tar naphtha or mixtures of these in any proportions. We may, for instance, mix 120 parts of benzol with 180 parts of coal tar naphtha and dissolve therein 100 parts by weight of the fluxed rubber mass hereinabove described. This gives a sprayable solution of low viscosity, which adheres very strongly to a clean metal surface, without need of a primer coat of any other material, and dries to a hard water-resistant coating. The drying action proceeds in about 20 minutes, at room temperature, to a point where the goods may be handled, and is completed, for all substantial purposes in about 1 hour. After that time a second coat can be readily applied to it. This possibility of drying at room temperature avoids the expense and trouble of using a high degree of heat for vulcanization. In fact, it will be noted in the above directions that no uncombined sulphur is added which might affect the varnished surface. We have present only the vulcanized sulphur, by which term we mean sulphur in the combined form brought about by the original vulcanization.

Of course, any suitable coloring matters and pigments may be added to the varnish thus produced. For example, when a dark or black varnish is preferred we can mix in asphaltum or carbon black. Brownish effects may be obtained by using burnt umber and red and brown oil soluble dyes. The surface effects of the varnish may be varied from lustrous to matte, by the use of various ones of the above-mentioned pigments and by selecting different resins. The higher grade copals tend particularly to give higher luster.

Having thus described our invention, what we claim as new and desire to secure by Letters Patent is:

1. The process of preparing a flowable liquid composition comprising the steps of melting hard rubber with a flux which includes an oil which dries when the composition is free from drying agents and dissolving the mixture thus produced in a liquid common solvent of said ingredients, said flux and solvent being free from drying agents.

2. The process of making a flowable liquid composition, comprising the steps of fluxing hard rubber with a resin and a drying oil and dissolving it in a liquid solvent of said ingredients.

3. The process of making a flowable liquid composition, comprising fluxing hard rubber with rosin and China wood oil and dissolving it in a liquid solvent of said ingredients.

4. The process of making a flowable liquid composition, comprising fluxing hard rubber with rosin and China wood oil and dissolving the mass thus obtained, in a solvent containing a liquid hydrocarbon of the benzene series.

5. The process of making a flowable liquid composition which comprises the steps of fluxing hard rubber with a resin and a drying oil between the temperatures of 200° C., and 250° C., and dissolving the mixture thus obtained in a liquid solvent of said ingredients.

6. The process of making a flowable liquid composition comprising the steps of incorporating comminuted hard rubber into a molten flux comprising a resin and a drying oil and heating until homogeneous fusion takes place, and thereafter dissolving the mass thus obtained in a liquid solvent of said ingredients.

7. The process of making a flowable liquid composition which comprises fluxing 60 parts by weight of hard rubber with a flux containing 28 parts of rosin and 12 parts of China wood oil, and dissolving the mass thus obtained in a liquid solvent of said ingredients.

8. The process of making a flowable liquid composition which comprises heating hard rubber until its susceptibility to fluxing is increased, fusing said hard rubber with a flux which includes a drying oil, the amount of oil being smaller than the amount of said hard rubber and dissolving the same in a liquid solvent of said ingredients.

9. The process of making a flowable liquid composition comprising the steps of heating hard rubber until its suceptibility to flux is increased, fluxing said hard rubber with a resin and a drying oil, and dissolving the mass thus produced in a liquid solvent of said ingredients.

10. The process of making a flowable liquid composition comprising heating hard rubber in an aqueous alkaline solution until its susceptibility to fluxing is increased, fusing said hard rubber with a flux which includes a drying oil, and dissolving it in a liquid solvent of said ingredients.

11. The process of making a flowable liquid composition which comprises heating hard rubber in an aqueous alkaline solution until its susceptibility to fluxing is increased, fluxing said hard rubber with a resin and drying oil and dissolving the mass thus produced in a liquid solvent of said ingredients.

12. The process of making a flowable liquid composition which comprises digesting comminuted hard rubber in an aqueous solution of caustic soda until its susceptibility to fluxing is increased, washing and drying said treated rubber, fluxing said rubber with a resin and a drying oil and dissolving the fluxed hard rubber in a liquid solvent of said ingredients.

13. The process of making a quick-drying, sprayable, liquid coating composition which comprises the steps of heating comminuted hard rubber in an aqueous alkaline solution until its susceptibility to flux is increased, drying said treated hard rubber and incorporating the same into a molten flux comprising 28 parts of resin to 12 parts of a drying oil, and heating it between 200° C., and 250° C., until homogeneous fusion takes place, and dissolving the mass thus produced in a solvent containing a liquid hydrocarbon of the benzene series.

14. The process of making a liquid coating composition which comprises digesting comminuted hard rubber in an aqueous solution of caustic soda from 2 to 5 hours, washing out the alkali and drying said treated hard rubber, incorporating the latter into a molten flux comprising rosin and China wood oil and heating between 200° C., and 250° C., until a homogeneous fusion takes place, and dissolving the fused mass thus obtained in three times its quantity of a solvent containing a liquid hydrocarbon of the benzene series.

15. In the process of treating hard rubber the step of fusing said hard rubber with a flux containing a resin and a drying oil.

16. In the process of treating hard rubber the step of fusing it with rosin and China wood oil.

17. In the process of treating hard rubber the step of fusing the same with a resin and a drying oil between 200° C., and 250° C., until a uniform fusion is obtained.

Signed at Rochester, New York, this 14th day of March, 1925.

SAMUEL E. SHEPPARD.
JOHN J. SCHMITT.